United States Patent
Grube et al.

[19]

[11] Patent Number: 6,031,455
[45] Date of Patent: Feb. 29, 2000

[54] METHOD AND APPARATUS FOR MONITORING ENVIRONMENTAL CONDITIONS IN A COMMUNICATION SYSTEM

[75] Inventors: Gary W. Grube, Barrington; Marc C. Naddell, Schaumburg; Mark L. Shaughnessy, Algonquin, all of Ill.

[73] Assignee: Motorola, Inc., Schaumburg, Ill.

[21] Appl. No.: 09/021,042

[22] Filed: Feb. 9, 1998

[51] Int. Cl.[7] .................................................. G08B 1/08
[52] U.S. Cl. .......................... 340/539; 340/511; 340/531; 340/825.72
[58] Field of Search .................................... 340/539, 531, 340/825.06, 825.69, 825.72, 825.44, 825.36, 825.49, 825.47, 511; 379/37, 38, 42

[56] References Cited

U.S. PATENT DOCUMENTS

| | | | |
|---|---|---|---|
| 3,925,763 | 12/1975 | Wadhwani et al. | 340/539 |
| 4,331,953 | 5/1982 | Blevins et al. | 340/539 |
| 4,692,742 | 9/1987 | Raizen et al. | 340/539 |
| 5,045,839 | 9/1991 | Ellis et al. | 340/539 |
| 5,204,670 | 4/1993 | Stinton | 340/825.54 |
| 5,283,733 | 2/1994 | Colley | 364/411 |
| 5,417,222 | 5/1995 | Dempsey et al. | 128/696 |
| 5,474,090 | 12/1995 | Begun et al. | 128/707 |
| 5,544,661 | 8/1996 | Davis et al. | 128/700 |
| 5,558,638 | 9/1996 | Evers et al. | 604/66 |
| 5,568,121 | 10/1996 | Lamensdorf | 340/539 |
| 5,576,952 | 11/1996 | Stutman et al. | 364/413.02 |
| 5,626,151 | 5/1997 | Linden | 128/897 |
| 5,942,986 | 8/1999 | Shabot et al. | 340/539 |

*Primary Examiner*—Donnie L. Crosland
*Attorney, Agent, or Firm*—Susan L. Lukasik

[57] ABSTRACT

A method and apparatus for monitoring and processing environmental conditions within a wireless communication system is accomplished when a subscriber (22), or group of subscribers, sense an environmental condition or conditions. Upon sensing the particular environmental condition (28) or conditions, the subscriber (or communication device) provides the information about the sensed environmental condition to infrastructure equipment over the wireless communication path. Once the infrastructure equipment receives the information about the sensed environmental condition, it processes it. The processing includes storing the information, averaging the information, predicting future environmental conditions, generating warning signals based on the levels of the environmental condition, and providing feedback to an individual communication device or a group of communication devices. Once information about the sensed environmental condition has been processed, the infrastructure equipment provides at least a selected portion of the processed data to a communication device, based on a subscription of the communication device.

26 Claims, 6 Drawing Sheets

METHOD AND APPARATUS FOR MONITORING ENVIRONMENTAL CONDITIONS IN A COMMUNICATION SYSTEM

TECHNICAL FIELD OF THE INVENTION

The present invention relates generally to wireless communication systems and more particularly to sensing and processing environmental conditions within the wireless communication system.

BACKGROUND OF THE INVENTION

Collecting and processing data from remote sensing devices is known. Typically, a remote sensor remains in a fixed location, senses a particular condition for the given location, and provides the sensed condition to a central processing device. For example, in weather monitoring systems, a remote sensing device is designed to monitor temperature, wind, barometric pressure and other weather conditions. The sensed weather conditions are then provided to a processing device, which compiles the data to describe current weather conditions, predict weather changes, and issue warnings when the weather is dangerous in a given area. Other remote sensors may be used along rivers to monitor water levels, along pipelines to monitor the flow rate within the pipes, along geographic faults to monitor seismic activity, within buildings to monitor smoke, etc.

Regardless of the type of remote sensor, the remote sensors are geographically fixed in location and are relatively few in number. For example, a weather sensing system may include only a few (e.g., less than 10) sensors for an entire state. Typically, weather monitoring systems are supplemented with manual monitoring of weather conditions. Thus, if a weather condition arises in which the public is to be notified (e.g., a tornado), the remote sensors may or may not have sensed the weather condition, depending on their geographic relationship to the weather condition. In many cases of dangerous weather conditions, human sightings provide a significant portion of the data. When dangerous weather conditions are detected, notifying people in harm's way is not always effective. Typically, the public is notified of hazardous weather conditions by local radio and television broadcasts and neighborhood sirens. But, those who are not currently watching a local television broadcast, listening to a local radio program, or within earshot of the siren, do not receive the warning of the approaching danger.

In centralized data collecting systems that monitor environmental conditions, such as pollen count, radon gas levels, heat index, carbon monoxide, etc, the warning is determined based on fixed thresholds. The fixed thresholds are usually established based on average sensitivity to the particular environmental condition. For people more sensitive to an environmental condition, the nominal threshold may be too high. Thus, for these people, the normal warning levels may not be appropriate to protect their safety. To overcome this problem, a person may have an individual sensor that monitors a particular environmental condition and provides a warning based on a threshold set by the user. While this provides the user with current environmental condition levels of the location he or she is at, assuming the monitor is working properly, the user has no indication as to the environmental conditions of other locations.

Therefore, a need exists for a method and apparatus that allows for more detailed collection of data regarding environmental conditions and allows for feedback regarding the environmental condition to be provided to the public in a more customized manner.

DESCRIPTION OF A PREFERRED EMBODIMENT

Generally, the present invention provides a method and apparatus for monitoring and processing environmental conditions within a wireless communication system. This is accomplished when a subscriber, or group of subscribers, sense an environmental condition or conditions. Upon sensing the particular environmental condition or conditions, the subscriber (or communication device) provides information about the sensed environmental condition to infrastructure equipment over a wireless communication path. Once the infrastructure equipment receives the information about the sensed environmental condition, it processes it. The processing includes storing the information, averaging the information, predicting future environmental conditions, generating warning signals based on the levels of the environmental condition, and providing feedback to an individual communication device or a group of communication devices. Once a sensed environmental condition has been processed, the infrastructure equipment provides at least a selected portion of the processed data to a communication device based on a subscription information. For example, if the communication device has subscribed to receiving feedback regarding pollen count, the infrastructure equipment would provide the current count level at the location of the communication device, the levels in surrounding areas, a warning signal based on the user's threshold, providing instructions to avoid harm, and/or prediction data as to upcoming pollen counts.

Figure 1:
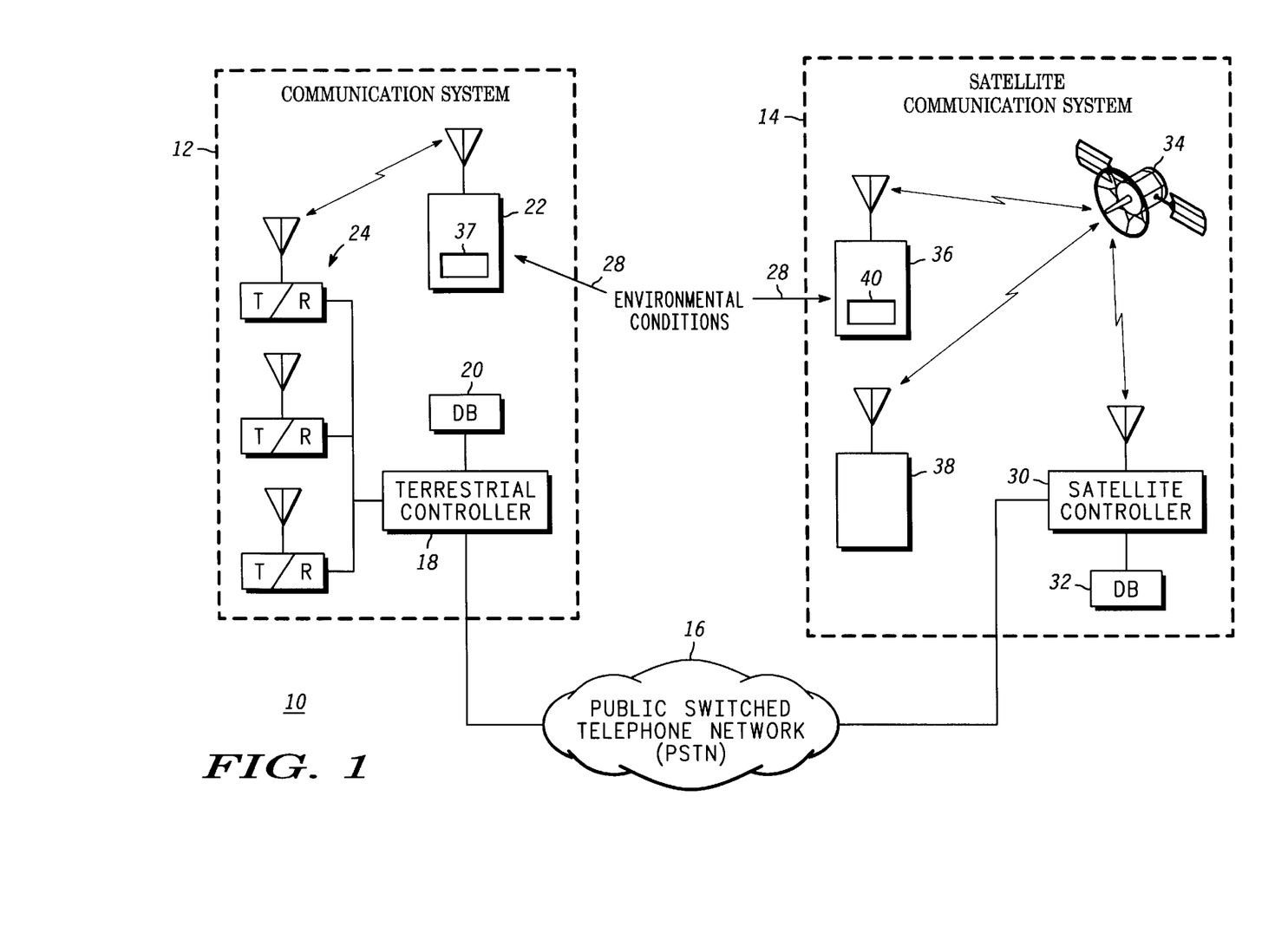
FIG. 1 illustrates a schematic block diagram of a communication environment in accordance with the present invention.

The present invention can be more fully described with reference to FIGS. 1 through 7. FIG. 1 illustrates a schematic block diagram of a communication environment 10. The environment 10 includes a communication system 12 and a satellite communication system 14, which are both coupled to a public switch telephone network ("PSTN") 16. Communication system 12 includes a plurality of subscribers, or communication devices, 22 and infrastructure equipment. The infrastructure equipment includes a terrestrial controller 18, a database 20, and a plurality of wireless communication transceivers 24. The subscribers 22 are each equipped with a sensor 37 and may be cellular telephones, land mobile radios, portable radios, personal digital assistance, portable computers equipped with a wireless modem, and/or any other device that receives or transmits data via a wireless communication path.

In operation, the subscriber units 22 senses environmental conditions 28, via the sensor 37, and provide the sensed data to the terrestrial controller 18 via a wireless communication path. The environmental conditions 28 may be weather conditions (e.g., barometric pressure, temperature, winds, humidity, etc.), hazardous gases (e.g., carbon monoxide, radon, chlorine, etc.), or allergens (e.g., pollen, dust, etc.). The sensor 37 may be a plurality of sensors to sense a plurality of environmental conditions, including weather conditions, allergen conditions, harmful gases, etc. Alternatively, the sensor 37 may be a single sensor that senses an individual environmental condition of the weather conditions, the allergy conditions, or the harmful gas conditions. Regardless of the environment sensed by the subscriber 22, it may subscribe to and receive feedback on any or all of the elements of the weather conditions, harmful gas conditions, and allergen conditions. In addition, the subscriber user may customize his or her threshold as to when the feedback is to be provided. For example, if a person is extremely allergic to pollen or dust, the threshold would be set very low, such that when the allergen condition exceeds the user defined threshold, an warning indication is provided to the user.

In addition to receiving feedback on the environmental conditions, a subscriber may be reconfigured based on the status level of the environmental conditions. For example, assume that fire department personnel are involved in fighting a fire and are operating subscriber units that are equipped with smoke detectors. When the smoke density reaches a predetermined level, the subscriber units are reconfigured to a hands free mode. In addition, the subscriber units may be reconfigured into a talk group established for responding to the particular environmental condition. Further, the subscriber units may be reconfigured to sensing a particular environmental condition (e.g., sensing smoke only, smoke and carbon monoxide, and/or other hazardous gases).

The controller 18 processes the environmental conditions on an individual basis, on a grouping basis, and/or on a regional basis. For example, if the user is processing allergen levels for an individual subscriber, the controller may only utilize information provided by the particular subscriber and other communication devices in the same area. Thus, the subscriber is being provided with information related to its immediate environmental area. For weather conditions, however, the controller may process information from a plurality of communication devices distributed throughout a large geographic area. The controller 18 utilizes the information to provide relevant weather information to the geographic area and parts thereof. The relevant information includes current weather conditions, predicted weather conditions, and/or dangerous weather conditions. The feedback to the communication devices may be short messaging services, audible alarms, verbal conditions and/or warnings, images, text messages or any combination thereof.

The communication environment 10 also includes a satellite communication system 14, which includes a plurality of subscribers 36 and 38 and infrastructure equipment. The infrastructure equipment includes a satellite controller 30, a database 32, and a satellite repeater 34. Subscriber 36 includes an environmental sensor 40 while subscriber unit 38 does not. Even though subscriber 38 does not include a sensor, it may receive feedback regarding environmental conditions of interest. Note that the satellite communication system 14 functions, as far as sensing environmental conditions, similarly to communication system 12. Further note that controller 30 and controller 18 may communicate with each other to share sensed environmental condition data.

Figure 2:
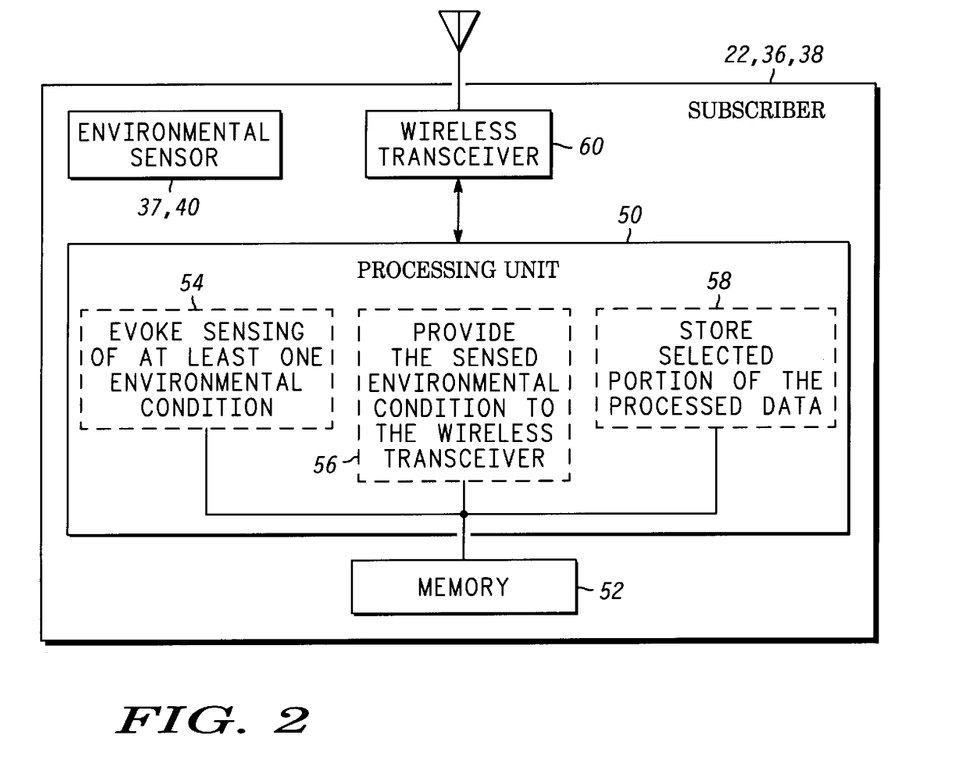
FIG. 2 illustrates a schematic block diagram of a communication device, or subscriber, in accordance with the present invention.

FIG. 2 illustrates a schematic block diagram of a communication device, or subscriber 22, 36, 38. The communication device includes a processing unit 50, memory 52, an environmental sensor 37, 40 and a wireless transceiver 60. The wireless transceiver 60 enables the subscriber to communicate with the wireless infrastructure equipment. The transmission of information over wireless communication paths is known, thus no further discussion will be presented except to illustrate the present invention. The environmental sensor 37, 40 senses an environmental condition or conditions and provides a digital representation (information) thereof to the processing unit 50. The environmental sensor 37, 40 sense weather conditions, allergen conditions, hazardous gas conditions, and/or any other type of environmental condition that would be of interest to a subscriber.

The processing unit 50 is a microprocessor, a microcontroller, a digital signal processor, a microcomputer, a central processing unit, and/or any other device that manipulates digital information based on programming instructions. The memory 52 is a read-only memory, random access memory, floppy disk memory, programmable memory, hard disk memory, CD ROM memory, DVD ROM memory, and/or any device that stores digital information.

The memory 52 stores programming instructions that, when read by the processing unit 50, causes the processing unit 50 to function as a plurality of circuits 54–58. While reading the programming instructions, the processing unit 50 functions as circuit 54 to evoke the sensing of at least one environmental condition by the environmental sensor 37, 40. The evoking may be done on a periodic basis, (e.g., once a minute, once every five minutes, once an hour, etc.), continually, or when prompted by the controller. Once the environmental condition is sensed, the processing unit 50 reads programming instructions that cause it to function as circuit 56. As circuit 56, the processing unit 50 provides the information about the sensed environmental conditions to the wireless transceiver. The wireless transceiver then transmits the information about the sensed environmental condition to the controller. Having done this, the processing unit then functions as circuit 58 to store selected portions of the processed data received from the controller via the wireless transceiver 60. The programming instructions executed by the processing unit 50 will be discussed in greater detail with reference to FIGS. 4 through 7.

Figure 3:
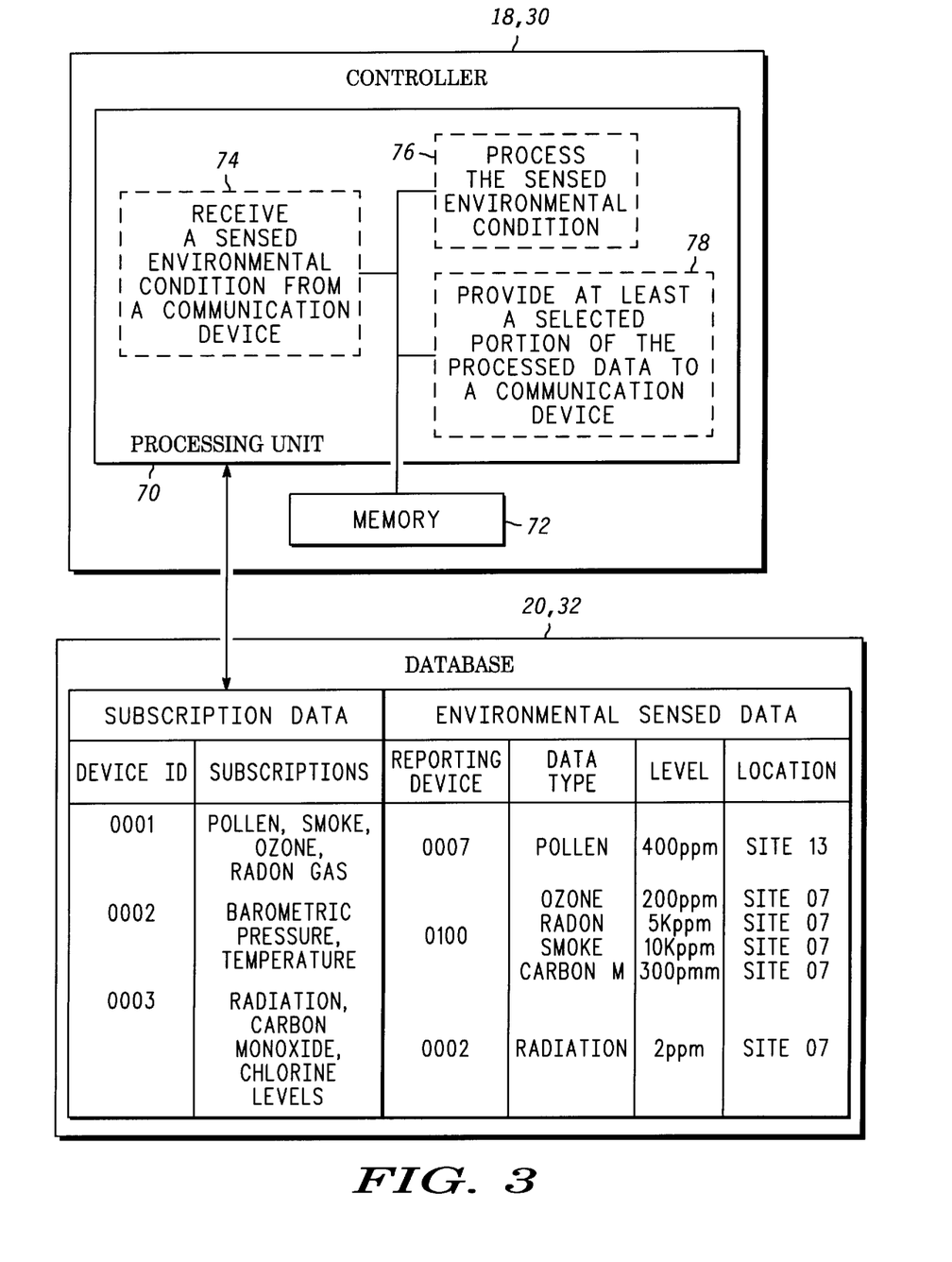
FIG. 3 illustrates a schematic block diagram of a controller and associated database in accordance with the present invention.

FIG. 3 illustrates a schematic block diagram of the controller 18, 30 coupled to the database 20, 32. The controller 18, 30 includes a processing unit 70 and memory 72. The processing unit 70 is a microprocessor, a central processing unit, a microcomputer, a microcontroller, a digital signal processor and/or any other device that manipulates digital information based on programming instructions. The memory 72 is a read-only memory, a random access memory, a floppy disk memory, a hard disk memory, a magnetic tape memory, a read programmable memory, a CD ROM memory, a DVD ROM memory, and/or any device that stores digital information.

The memory 72 stores programming instructions that, when read by the processing unit 70, causes the processing unit 70 to function as a plurality of circuits 74–78. While reading the programming instructions, the processing unit 70 functions as circuit 74 to receive information about a sensed environmental condition from at least one communication device. The processing unit 70 then functions as circuit 76 to process the information about the sensed environmental condition. Having processed the information about the sensed environmental condition, the processing unit 70 then functions as circuit 78 to provide at least a selected portion of the processed data to a communication device, where the selected portion is based on subscription data of the communication device. The programming instructions performed by processing unit 70 will be discussed in greater detail with reference to FIGS. 4 through 7.

The database 20, 32 includes two sections, one for storing subscription data and the other for storing environmental sensed data. The subscription data includes the communication device identification code and an indication of which environmental conditions are of interest to the subscriber. In addition, the subscription data may include customization information such as unique thresholds, special customized reconfiguration information, and/or customized warning information. As shown, the communication device with the identity of 0001 has subscribed to information related to pollen, smoke, ozone, and radon gas. The subscriber may select individual threshold levels as to when the controller is to inform the subscriber of hazardous conditions related to each of these environmental conditions. The subscriber may also, or as an alternative, instruct the controller to provide the numerical readings related to the subscribed to environmental conditions. Still further, the subscriber may instruct the controller to base the processing of the subscribed to environmental feedback strictly on the information provided by this particular communication device or a plurality of communication devices within a user defined geographical area. As still a further alternative, each of these parameters, i.e., the number of communication devices providing the information, the thresholds, the geographic region of concern, etc. would be default parameters established by the communication system administrator.

The environmental sensed data portion of database 20 and 32 include the reporting communication devices' identity or identification code, the data type, the measured level, and the location of the communication device. As shown, a communication device having an identity of 0007 has sensed data related to pollen wherein the level is at 400 ppm and the communication device is located at site 13. The location information may be based on the site in which the communication device is affiliated or geographic coordinates that are determined by a global position satellite system ("GPS"), a Loran location system, or any other mechanism for providing geographic coordinates related to a location. The controller 30 may store the environmentally sensed data for a short duration (e.g., an hour or less), a long duration (e.g., over a week), or any amount of time there between. In addition, the controller may process the data in numerous ways such as averaging, prediction, warning generation, tabulation, etc. As one having ordinary skill in the art will readily appreciate, the collected data may be processed in many ways.

Figure 4:
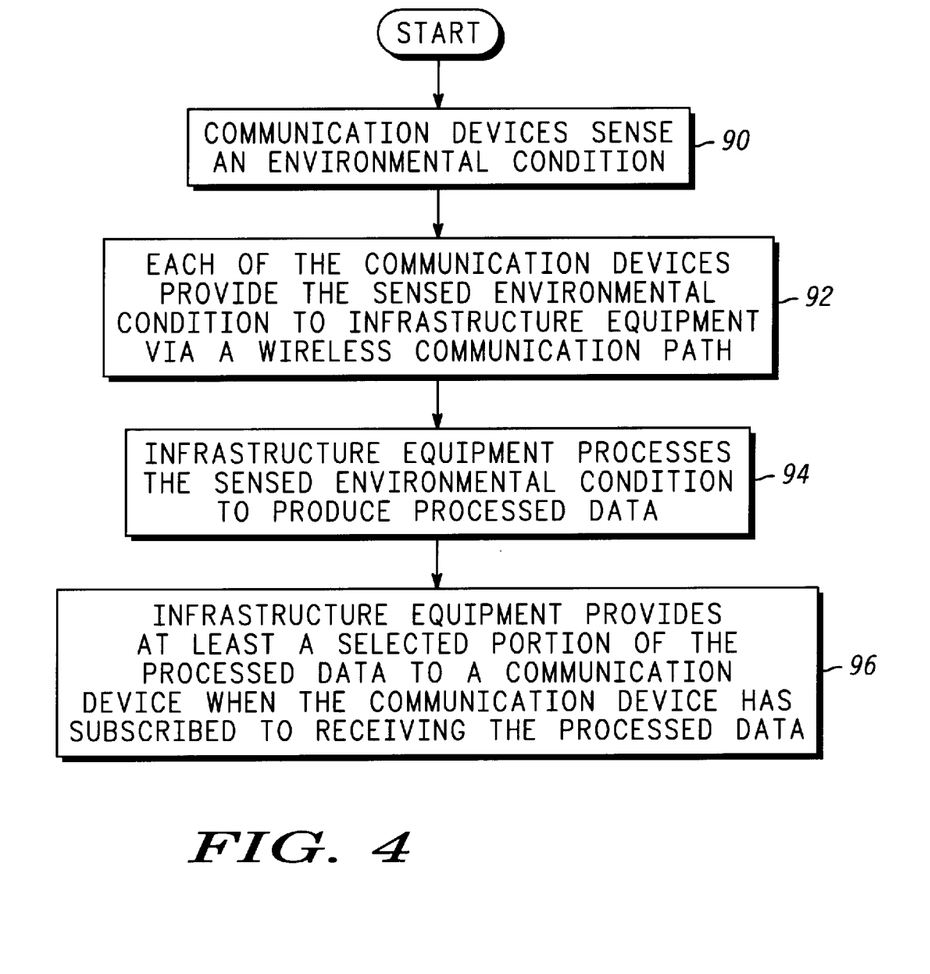
FIG. 4 illustrates a logic diagram of a method for processing environmental conditions in accordance with the present invention.

FIG. 4 illustrates a logic diagram of a method for monitoring and processing environmental conditions within a wireless communications system. The process begins at step 90 where a communication device or a plurality of communication devices, sense an environmental condition. The environmental condition includes, but is not limited to, pollen count, ozone levels, barometric pressure, temperature, smoke density, radiation levels, radon gas levels, carbon monoxide levels, and/or chlorine levels. Having sensed the environmental condition, the process proceeds to step 92 where each of the communication devices provides the information about the sensed environmental condition to the infrastructure equipment via a wireless communication path.

The communication devices may provide the information about the sensed environmental conditions in numerous ways. For example, a communication device may collect the data and provide it, unaltered and unreviewed, to the controller. As such, the communication device is acting as a mobile remote sensor. Alternatively, the communication devices may interpret the sensed data before providing it to the controller. The interpretation includes, but is not limited, comparing the sensed data against a threshold, if it does not compare favorably (e.g., is less than the threshold), the data is not provided to the controller. Note that the data provided to controller would also include the communication device's location information, device identification and data type.

Once the information about the sensed environmental condition has been provided to the infrastructure equipment, the process proceeds to step 94. At step 94, the infrastructure equipment processes the information about the sensed environmental condition to produce processed data. The infrastructure equipment may process the data by performing an averaging function on a group of related sensed environmental conditions, performing a trend analysis function, performing a prediction function, and/or providing a response instruction function. As an alternative, or in addition to, the infrastructure equipment may further process the information about the sensed environmental conditions by comparing it to a threshold. The threshold is based on a nominal value for a plurality of communication devices, an individual user's dependent threshold and/or a group dependent threshold. The infrastructure equipment may first do a comparison on the information about the sensed environmental condition; i.e., if the information about the sensed environmental condition is below a threshold, it will not process the data, if it is above the threshold, it will process the data.

The process then proceeds to step 96 where the infrastructure equipment provides at least a selected portion of the processed data to a communication device. The selected portion is based on which environmental services the communication device has subscribed to. The processed data or selected portions thereof, may be continually provided to the communication device, periodically provided, or based upon certain conditions being met. For example, if the environmental condition did not compare favorably with the threshold, the processed data would not be sent to the communication device. In addition to providing the selected processed environmental data, the infrastructure may send reconfiguration information to the communication device. The reconfiguration information causes the communication device to modify its functionality. For example, depending on the environmental condition, the reconfiguration information may cause the communication device to join a particular communication group, operate in an emergency mode, and/or in a limited or enhanced service set. Note that a communication device may sense one type of environmental condition and receive processed environmental data for another environmental condition. For example, a communication device may be sensing ozone levels but has only subscribed to receiving information relating to the pollen count.

Figure 5:
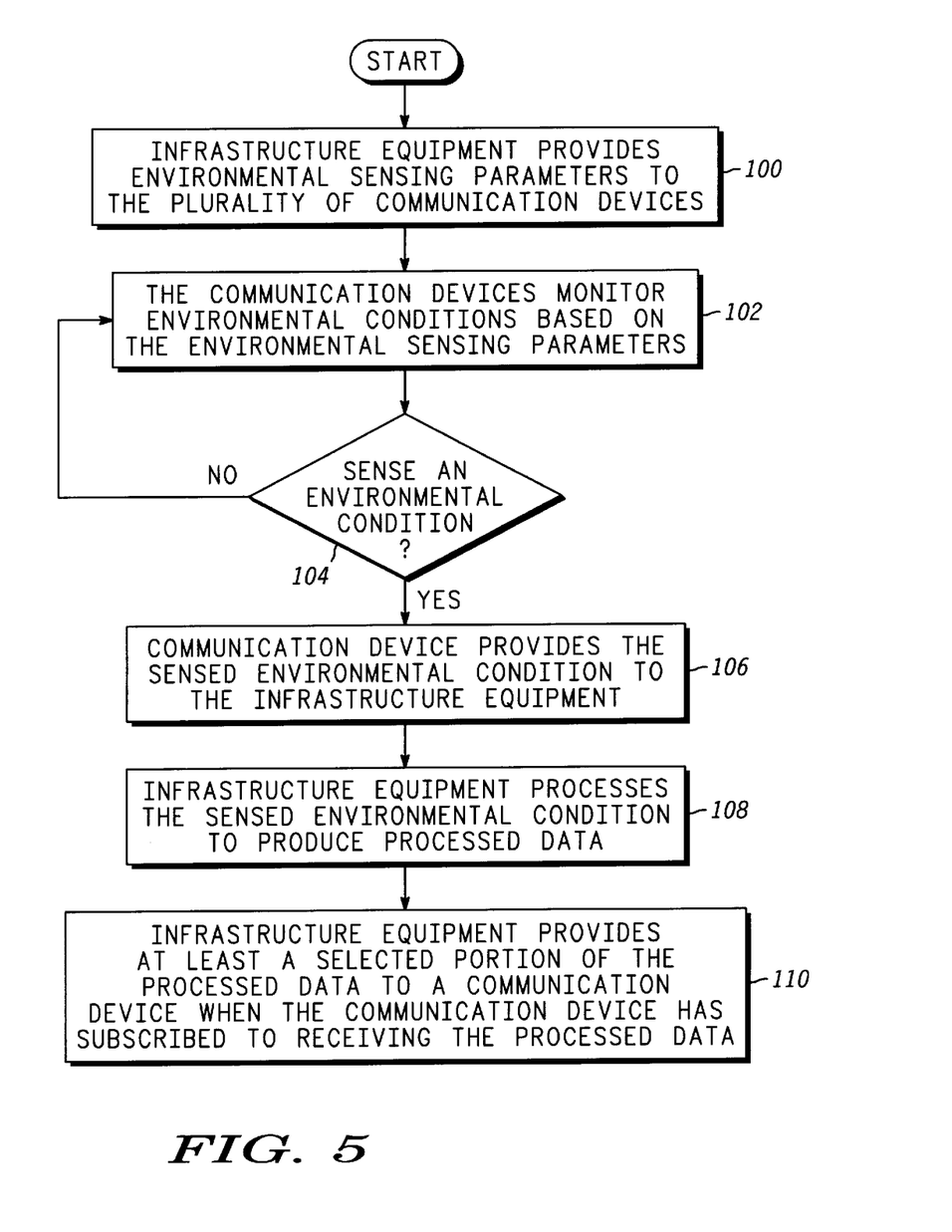
FIG. 5 illustrates a logic diagram of an alternate method for processing environmental conditions in accordance with the present invention.

FIG. 5 illustrates a logic diagram of an alternate method for monitoring and processing environmental conditions within a wireless communications system. The process begins at step 100 where the infrastructure equipment provides environmental sensing parameters to the plurality of communication devices. The environmental sensing parameters include designating at least one communication device of the plurality of communication devices to sense the environmental condition, designating at least one communication device of the plurality of communication device to sense an environmental condition in a given geographical area and/or designating specific environmental conditions to be sensed. As such, the controller may orchestrate what environmental conditions a communication device will sense, what conditions will be sensed in a given geographical area, and how many communication devices will sense that the environmental condition.

The process then proceeds to step 102 where the communication devices monitor environmental conditions based on the environmental sensing parameters. The process then proceeds to step 104 where a determination is made as to whether any of the communication devices have sensed the environmental condition. If not, the process repeats at steps 102 and 104 until an environmental condition is sensed.

Once an environmental condition is sensed, the process proceeds to step 106. At step 106, a communication device provides the information about the sensed environmental condition to the infrastructure equipment. The process then proceeds to step 108 where the infrastructure equipment processes the information about the sensed environmental condition to produce processed environmental data. The process then proceeds to step 110 where the infrastructure provides at least a selected portion of the processed data to a communication device. The selected portion is based on which environmental conditions the communication device has subscribed to.

Figure 6:
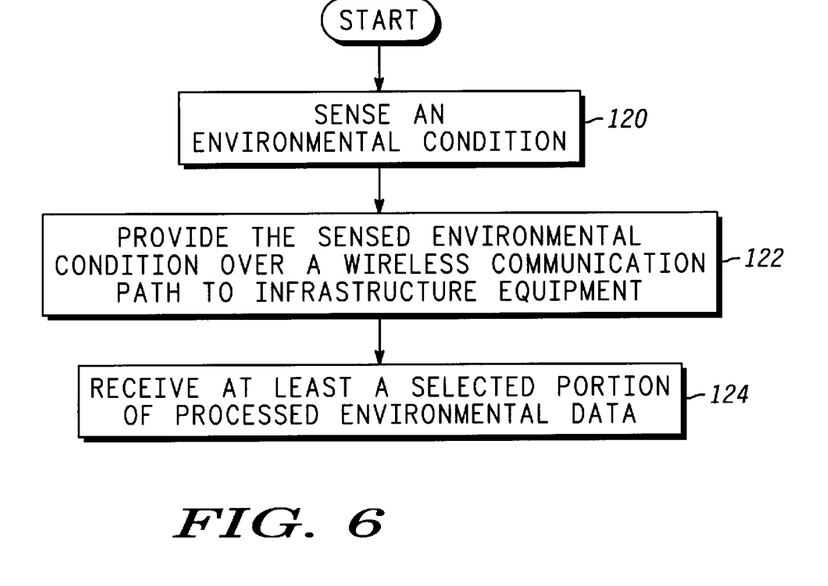
FIG. 6 illustrates a logic diagram of a method for a communication device to monitor environmental conditions in accordance with the present invention.

FIG. 6 illustrates a logic diagram of a method for a communication device to monitor environmental conditions within a wireless communication system. The process begins at step 120 where the communication device senses an environmental condition. As previously discussed, the environmental condition may be weather conditions, allergen conditions, and/or hazardous gas conditions. The process then proceeds to step 122 where the communication device provides the information about the sensed environmental condition to the infrastructure equipment over a wireless communication path. The communication device may do this on a periodic basis without any preprocessing of the data or may preprocess the data. To preprocess the data, the communication device compares the information about the sensed environmental condition with a threshold. If the environmental condition compares favorable (e.g., exceeds the threshold), the communication device provides the information about the sensed environmental condition to the infrastructure equipment.

The process then proceeds to step 124 where the communication device receives at least a selected portion of the processed environmental data. The received processed environmental data may be different than the information about the sensed environmental condition that it provided to the infrastructure equipment. In addition, the processed environmental data may include reconfiguration information, which causes the subscriber unit, or communication device, to modify its functionality.

Figure 7:
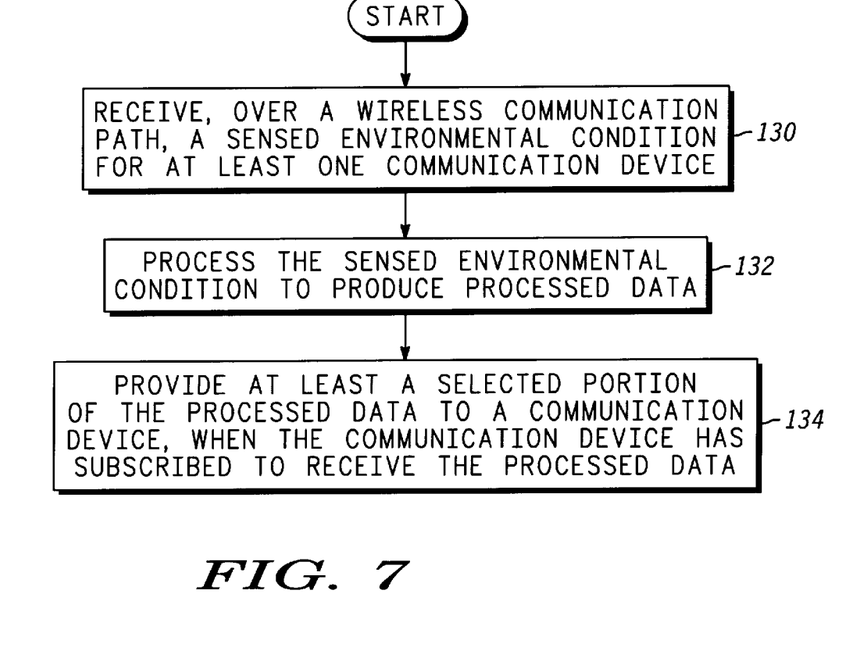
FIG. 7 illustrates a logic diagram of a method for a controller to process environmental conditions in accordance with the present invention.

FIG. 7 illustrates a logic diagram of a method for a controller of the infrastructure equipment to process environmental conditions. The process begins at step 130 where the controller receives information about a sensed environmental condition from at least one communication device over a wireless communication path. The information about the sensed environmental condition includes data type, device identification, data and may also include location information of the communication device. The process then proceeds to step 132 where the controller processes the information about the sensed environmental condition to produce processed environmental data, as described above. The process then proceeds to step 134 where the controller provides at least a selected portion of the processed data to a communication device. The selected portion is based on subscription data, which indicates the particular environmental conditions that are of interest to the communication device. As one having ordinary skill in the art will readily appreciate, the programming instructions used to implement the process illustrated in FIGS. 4–7 may be stored on a stand-alone memory device, such as a floppy disk memory, a hard disk memory, a magnetic tape memory, a read programmable memory, a CD memory, a DVD memory, and/or any device that stores digital information.

The preceding discussion has presented a method and apparatus for processing and monitoring environmental conditions within a wireless communications system. By having a plurality of mobile communication devices sensing environmental conditions, the quantity and range of sensed data is dramatically increased over fixed remote sensing systems. In addition, by utilizing wireless communication devices, centralized processing of the data can provide customized warnings to users of the communication devices. As such, the present invention further provides warnings of dangerous environmental conditions to an audience that would not have received the warning via traditional warning systems.

What is claimed is:

1. In a wireless communication system that includes infrastructure equipment and a plurality of communication devices, a method for monitoring environmental conditions, the method comprises the steps of:

a) sensing an environmental condition by at least some of the plurality of communication devices to produce information about the sensed environmental condition;

b) providing, over a wireless communication path, the information about the sensed environmental condition to the infrastructure equipment;

c) processing the information about the sensed environmental condition by the infrastructure equipment to produce processed data; and d) providing at least a selected portion of the processed data to at least one communication device of the plurality of communication devices when the at least one communication device has subscribed to the at least the selected portion of the processed data.

2. The method of claim 1 further comprises, within step (c):

determining whether the information about the sensed environmental condition compares favorably to a threshold, wherein the threshold is based on at least one of: a nominal value for the plurality of communication devices, an individual user dependent threshold, and a group dependent threshold; and processing the information about the sensed environmental condition when the information about the sensed environmental condition compares favorably to the threshold.

3. The method of claim 1 further comprises obtaining, by the infrastructure equipment, location information with the information about the sensed environmental condition, and utilizing the location information to process the information about the sensed environmental condition.

4. The method of claim 1 further comprises:
provide, by the infrastructure equipment, reconfiguration information to the at least one communication device; and
modifying, by the at least one communication device, functionality of the at least one communication device based on the reconfiguration information.

5. In a wireless communication system that includes infrastructure equipment and a plurality of communication devices, a method for monitoring environmental conditions, the method comprises the steps of:
a) providing, by the infrastructure equipment, environmental sensing parameters to the plurality of communication devices;
b) monitoring, by the plurality of communication devices, environmental conditions based on the environmental sensing parameters;
c) when an environmental condition is consistent with the environmental sensing parameters, providing, by at least one communication device of the plurality of communication devices, information about the sensed environmental condition to the infrastructure equipment; and
d) processing the information about the sensed environmental condition by the infrastructure equipment to produce processed data.

6. The method of claim 5 further comprises, within step (a), providing the environmental sensing parameters to include at least one of: designating at least one communication device of the plurality of communication devices to sense the environmental condition, designating, per given geographic area, at least one communication device of the plurality of communication devices to sense the environmental condition, and designating specific environmental conditions to be sensed.

7. The method of claim 5 further comprises providing the processed data to at least one communication device of the plurality of communication devices based on subscription data.

8. The method of claim 5 further comprises, within step (d):
determining whether the information about the sensed environmental condition compares favorably to a threshold, wherein the threshold is based on at least one of: a nominal value for the plurality of communication devices, an individual user dependent threshold, and a group dependent threshold; and
processing the information about the sensed environmental condition when the information about the sensed environmental condition compares favorably to the threshold.

9. The method of claim 8 further comprises providing at least a selected portion of the processed data to at least one communication device when the when the information about the sensed environmental condition compares favorably to the threshold.

10. The method of claim 5 further comprises obtaining, by the infrastructure equipment, location information with the information about the sensed environmental condition, and utilizing the location information to process the information about the sensed environmental condition.

11. The method of claim 5 further comprises:
providing, by the infrastructure equipment, reconfiguration information to the at least one communication device; and
modifying, by the at least one communication device, functionality of the at least one communication device based on the reconfiguration information.

12. In a wireless communication system that includes infrastructure equipment and a plurality of communication devices, a method for a communication device of the plurality of communication devices to facilitate monitoring environmental conditions, the method comprises the steps of:
a) sensing an environmental condition to produce information about the sensed environmental condition;
b) providing, over a wireless communication path, the information about the sensed environmental condition to the infrastructure equipment; and
c) receiving at least a selected portion of processed environmental data.

13. The method of claim 12 further comprises, within step (b):
determining whether the information about the sensed environmental condition compares favorably to a threshold; and
when the information about the sensed environmental condition compares favorably to the threshold, providing the information about the sensed environmental condition to the infrastructure equipment.

14. The method of claim 12 further comprises:
receiving reconfiguration information as the at least a selected portion of processed data; and
modifying functionality of the communication device based on the reconfiguration information.

15. In a wireless communication system that includes infrastructure equipment and a plurality of communication devices, a method for infrastructure equipment to facilitate monitoring environmental conditions, the method comprises the steps of:
a) receiving, over a wireless communication path, information about the sensed environmental condition from at least some of the plurality of communication devices;
b) processing the information about the sensed environmental condition to produce processed data; and
c) providing at least a selected portion of the processed data to at least one communication device of the plurality of communication device when the at least one communication device has subscribed to the at least a selected portion of the processed data.

16. The method of claim 15 further comprises, within step (b):
determining whether the information about the sensed environmental condition compares favorably to a threshold, wherein the threshold is based on at least one of: a nominal value for the plurality of communication devices, an individual user dependent threshold, and a group dependent threshold; and
processing the information about the sensed environmental condition when the information about the sensed environmental condition compares favorably to the threshold.

17. The method of claim 16 further comprises, within step (c), providing the at least a selected portion of the processed data to the at least one communication device when the information about the sensed environmental condition compares favorably to the threshold.

18. The method of claim 15 further comprises obtaining location information with the information about the sensed environmental condition, and utilizing the location information to process the information about the sensed environmental condition.

19. The method of claim 15 further comprises providing reconfiguration information to the at least one communication device, wherein the reconfiguration information is based on the processed data.

20. A communication device comprising:

a wireless transceiver operable to transceive data with infrastructure equipment of a wireless communication system;

an environmental sensor operable to sense at least one environmental condition;

a processing unit operably coupled to the wireless transceiver and the environmental sensor; and memory operably coupled to the processing unit, wherein the memory stores programming instructions that, when read by the processing unit, cause the processing unit to function as circuits to (a) evoke sensing of the at least one environmental condition to produce information about the sensed environmental condition; (b) provide the information about the sensed environmental condition to the wireless transceiver for transmission to the infrastructure equipment; and (c) store in the memory at least a selected portion of processed data, wherein the information about the sensed environmental condition is processed to produced the processed data.

21. The communication device of claim 20 further comprises, within the memory, programming instructions that, when read by the processing unit, cause the processing unit to function as a circuit that:

determines whether the information about the sensed environmental condition compares favorably to a threshold; and provides the information about the sensed environmental condition to the infrastructure equipment when the information about the sensed environmental condition compares favorably to the threshold.

22. The communication device of claim 20 further comprises, within the memory, programming instructions that, when read by the processing unit, cause the processing unit to function as a circuit that:

receives reconfiguration information as the at least a selected portion of processed data; and modifies functionality of the communication device based on the reconfiguration information.

23. A controller of wireless infrastructure equipment comprising:

a processing unit; and memory operably coupled to the processing unit, wherein the memory stores programming instructions that, when read by the processing unit, cause the processing unit to function as circuits to (a) receive information about the sensed environmental condition from at least some of a plurality of communication devices; (b) process the information about the sensed environmental condition to produce processed data; and (c) provide at least a selected portion of the processed data to at least one communication device of the plurality of communication devices when the at least one communication device has subscribed to the at least a selected portion of the processed data.

24. The controller of claim 23 further comprises, within the memory, programming instructions that, when read by the processing unit, cause the processing unit to function as a circuit that: determines whether the information about the sensed environmental condition compares favorably to a threshold, wherein the threshold is based on at least one of: a nominal value for the plurality of communication devices, an individual user dependent threshold, and a group dependent threshold.

25. The controller of claim 23 further comprises, within the memory, programming instructions that, when read by the processing unit, cause the processing unit to function as a circuit that: obtains location information with the information about the sensed environmental condition, and utilizes the location information to process the information about the sensed environmental condition.

26. The controller of claim 23 further comprises, within the memory, programming instructions that, when read by the processing unit, cause the processing unit to function as a circuit that: provides reconfiguration information to the at least one communication device, wherein the reconfiguration information is based on the processed data.

* * * * *

UNITED STATES PATENT AND TRADEMARK OFFICE
CERTIFICATE OF CORRECTION

PATENT NO. : 6,031,455

DATED : February 29, 2000

INVENTOR(S) : Grube, et al.

It is certified that error appears in the above-identified patent and that said Letters Patent is hereby corrected as shown below:

Column 9, line 53 reads "when the when the" should be
      --when the--

Signed and Sealed this

Third Day of April, 2001

Attest:

NICHOLAS P. GODICI

*Attesting Officer*     *Acting Director of the United States Patent and Trademark Office*